US011990667B2

(12) United States Patent
Yamauchi et al.

(10) Patent No.: US 11,990,667 B2
(45) Date of Patent: May 21, 2024

(54) ON-VEHICLE RADAR APPARATUS

(71) Applicant: DENSO CORPORATION, Kariya (JP)

(72) Inventors: Satoshi Yamauchi, Kariya (JP); Yuuya Sugihara, Obu (JP)

(73) Assignee: DENSO CORPORATION, Kariya (JP)

(*) Notice: Subject to any disclaimer, the term of this patent is extended or adjusted under 35 U.S.C. 154(b) by 446 days.

(21) Appl. No.: 17/461,356

(22) Filed: Aug. 30, 2021

(65) Prior Publication Data
US 2021/0391639 A1 Dec. 16, 2021

Related U.S. Application Data

(63) Continuation of application No. PCT/JP2020/008064, filed on Feb. 27, 2020.

(30) Foreign Application Priority Data

Mar. 1, 2019 (JP) .................................. 2019-037821

(51) Int. Cl.
H01Q 1/22 (2006.01)
G01S 7/03 (2006.01)
G01S 13/931 (2020.01)
H01R 12/71 (2011.01)

(52) U.S. Cl.
CPC ............. H01Q 1/2283 (2013.01); G01S 7/03 (2013.01); G01S 13/931 (2013.01); H01R 12/71 (2013.01)

(58) Field of Classification Search
CPC ........ H01Q 1/2283; H01Q 1/42; G01S 7/027; G01S 7/03; G01S 13/931; H01R 12/00; H01R 12/71; H01R 12/724; H01R 24/66; H01R 2201/26
See application file for complete search history.

(56) References Cited

U.S. PATENT DOCUMENTS

| 5,392,197 A * | 2/1995 | Cuntz | H05K 5/0047 |
| | | | 257/668 |
| 6,343,953 B2 * | 2/2002 | Nakamura | H01R 13/506 |
| | | | 439/589 |
| 6,600,103 B1 * | 7/2003 | Schmidt | H01Q 15/0013 |
| | | | 174/559 |

(Continued)

FOREIGN PATENT DOCUMENTS

| JP | 2001-142572 A | 5/2001 |
| JP | 2003059355 A | 2/2003 |

(Continued)

Primary Examiner — Peter M Bythrow
(74) Attorney, Agent, or Firm — MASCHOFF BRENNAN

(57) ABSTRACT

An on-vehicle radar apparatus includes a printed circuit board in which at least one radar antenna pattern unit is mounted on a first surface thereof, a case, a cover, and a connector receiving portion. In a situation that a first connector is mounted on the printed circuit board such that a first terminal forms a first angle with respect to a first surface of the printed circuit board, the connector receiving portion receives the first connector to be exposed from the case. In a situation that a second connector is mounted on the printed circuit board such that a second terminal forms a second angle with respect to the first surface of the printed circuit board, the connector receiving portion receives the second connector to be exposed from the case.

6 Claims, 11 Drawing Sheets

(56) References Cited

U.S. PATENT DOCUMENTS

| | | | |
|---|---|---|---|
| 6,674,412 B1* | 1/2004 | Schmidt | H01Q 19/062 |
| | | | 343/872 |
| 7,144,275 B2* | 12/2006 | Iida | H05K 5/0069 |
| | | | 439/587 |
| 7,744,381 B2* | 6/2010 | Honda | H05K 5/0052 |
| | | | 439/79 |
| 8,657,609 B2* | 2/2014 | Yanagisawa | H05K 5/0056 |
| | | | 439/79 |
| 8,942,001 B2* | 1/2015 | Kawai | H05K 5/0052 |
| | | | 361/728 |
| 9,293,870 B1* | 3/2016 | Koczwara | H05K 5/0069 |
| 9,730,349 B2* | 8/2017 | Nuriya | H05K 5/03 |
| 10,884,120 B2* | 1/2021 | Yu | H01Q 1/02 |
| 11,097,366 B2* | 8/2021 | Ogawa | B23K 1/0008 |
| 2006/0046535 A1* | 3/2006 | Iida | H05K 5/062 |
| | | | 439/76.1 |
| 2009/0237896 A1* | 9/2009 | Yamauchi | H05K 5/0069 |
| | | | 361/752 |
| 2015/0077959 A1* | 3/2015 | Loibl | H05K 7/10 |
| | | | 439/78 |
| 2015/0097730 A1 | 4/2015 | Pontes | |
| 2015/0331087 A1* | 11/2015 | Philipp | H05K 5/0056 |
| | | | 361/752 |

FOREIGN PATENT DOCUMENTS

| | | |
|---|---|---|
| JP | 2007-189215 A | 7/2007 |
| JP | 2008175622 A | 7/2008 |

* cited by examiner

FIG.1
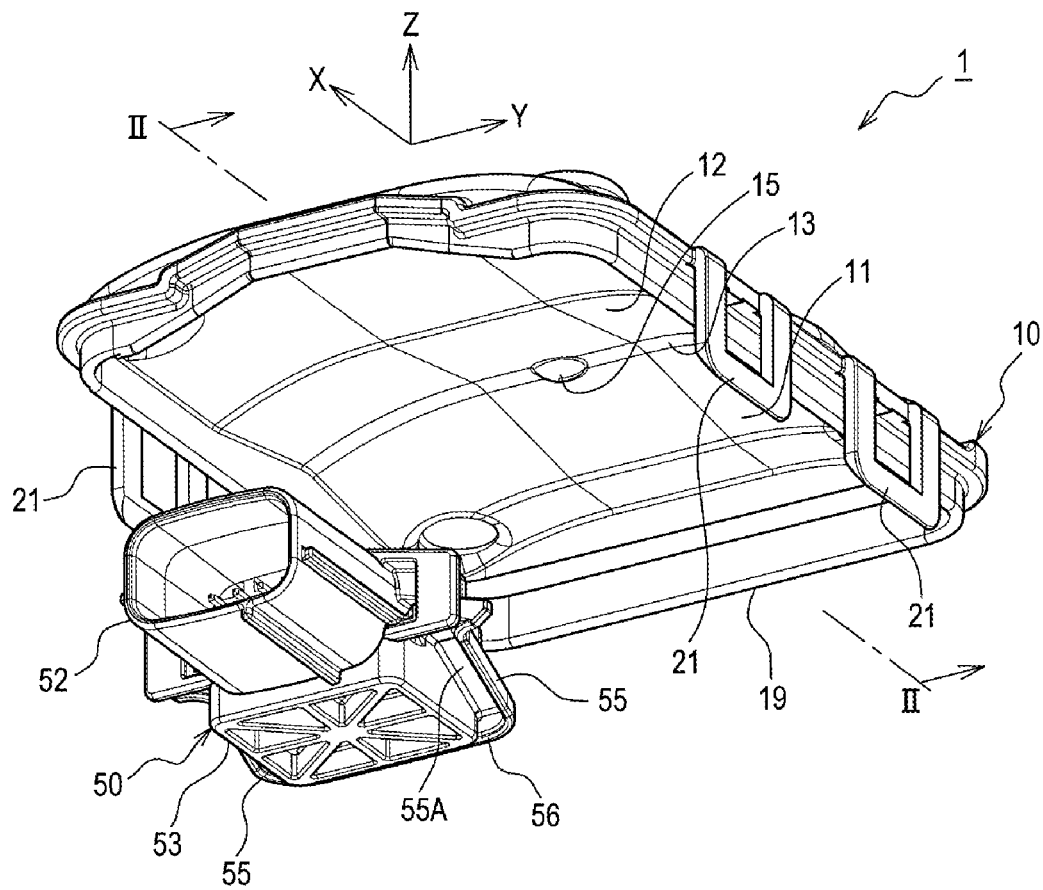
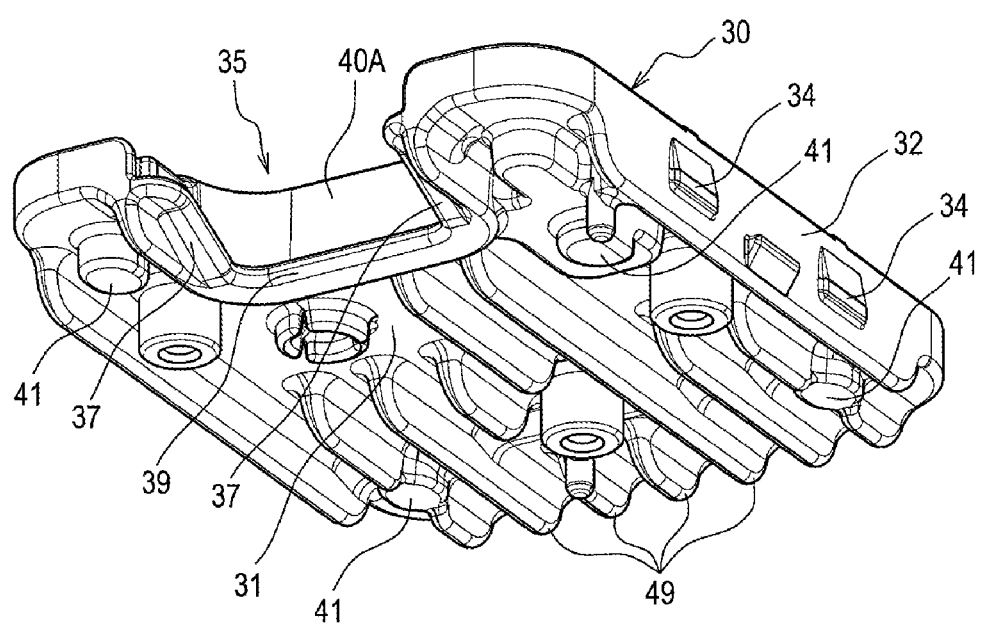

ON-VEHICLE RADAR APPARATUS

CROSS-REFERENCE TO RELATED APPLICATION

This application is the U.S. bypass application of International Application No. PCT/JP2020/008064 filed Feb. 27, 2020 which designated the U.S. and claims priority to Japanese Patent Application No. 2019-37821, filed Mar. 1, 2019, the contents of which are incorporated herein by reference.

BACKGROUND

Technical Field

The present disclosure relates to an on-vehicle radar apparatus mounted on a vehicle, provided with a radar antenna pattern unit capable of transmitting and receiving radar waves.

Description of the Related Art

According to various electronic apparatuses including a connector, a technique is proposed in which an orientation of the connector (i.e. direction to which terminals connected to other equipment extend in the other equipment) is set to be variable with respect to the printed circuit board supported by the casing.

As a result of detailed research by the inventors, the inventors have found a problem, when applying a mechanism to an on-vehicle radar apparatus, in which the orientation of the connector may be changed by an external force due to vibration or the like of the vehicle. On the other hand, in recent years, due to a requirement of executing various controls for automatic driving and the like, for example, detection of obstacles in various directions in the vicinity of the vehicle is increasingly necessary. Therefore, the on-vehicle radar apparatuses are required to be mounted to various locations in the vehicle.

SUMMARY

An on-vehicle radar apparatus according to one aspect of the present disclosure is provided with a printed circuit board, a case and a cover. The radar antenna pattern unit capable of transmitting and receiving radar waves is mounted on a first surface of the printed circuit board. The case supports the printed circuit board. The cover covers the printed circuit board from a portion opposite to the case, and is connected to the case, whereby the cover cooperating with the case surround the printed circuit board.

BRIEF DESCRIPTION OF THE DRAWINGS

In the accompanying drawings:

FIG. 1 is an exploded perspective view showing a configuration of an on-vehicle radar apparatus according to an embodiment;

DETAILED DESCRIPTION OF THE PREFERRED EMBODIMENTS

Figure 2:
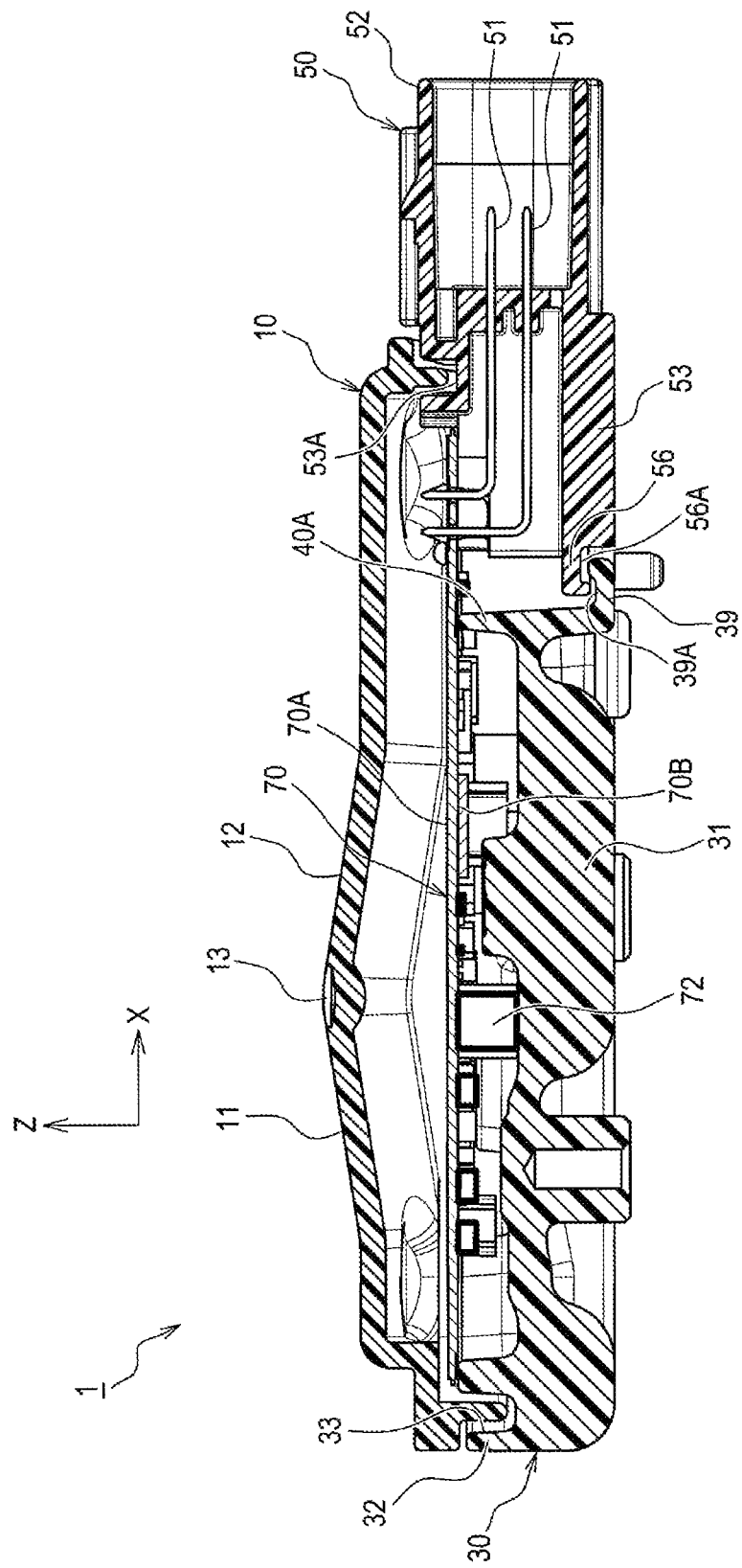
FIG. 2 is a sectional view taken along line II-II showing a configuration of an on-vehicle radar device according to an embodiment.

According to various electronic apparatuses including a connector, for example, as disclosed in Japanese Patent Application Laid-Open Publication No. 2001-142572, a technique is proposed in which an orientation of the connector (i.e. direction to which terminals connected to other equipment extend in the other equipment) is set to be variable with respect to the printed circuit board supported by the casing.

As a result of detailed research by the inventors, the inventors have found a problem, when applying the mechanism disclosed by the above-described patent literature to an on-vehicle radar apparatus, in which the orientation of the connector may be changed by an external force due to vibration or the like of the vehicle. On the other hand, in recent years, due to a requirement of executing various controls for automatic driving and the like, for example, detection of obstacles in various directions in the vicinity of the vehicle is increasingly necessary. Therefore, the on-vehicle radar apparatuses are required to be mounted to various locations in the vehicle. In this respect, the inventors also have found a problem, when mounting the on-vehicle radar apparatus in various locations in the vehicle, that orientations of respective connectors with respect to the printed circuit board on which the radar antenna pattern unit is mounted, may be changed depending on the locations of the radar apparatuses mounted in the vehicle. Moreover, the inventors have found a problem, other than a case where the on-vehicle radar apparatuses are mounted to various locations in the vehicle, that various situations may require changing the orientations of the connectors with respect to the printed circuit board and also preventing the orientations from being changed due to the external force.

The casing that supports the printed circuit board may be prepared corresponding to respective orientations of the connectors with respect to the printed circuit board. However, in view of cost reduction, the inventors have found that the casing of the on-vehicle radar apparatuses in the vehicle should be commonly used for respective on-vehicle radar apparatuses as much as possible.

Hereinafter, with reference to the drawings, embodiments of the present disclosure will be described.

First Embodiment 1-1. Configuration

As shown in FIG. 1, an on-vehicle radar apparatus 1 according to a first embodiment is provided with a cover 10 (i.e. upper case), a case (i.e. lower case) and a connector 50. In the following description, a right-handed coordinate system is defined in which +Z direction is a direction towards the cover 10 from the case 30 and +X direction is a direction where the connector 50 protrudes from the cover 10 and the case 30 in a state where the on-vehicle radar apparatus 1 is assembled. Note that these directions are defined for the sake of convenience in order to simply explain a positional relationship between respective portions which constitute the on-vehicle radar apparatus 1. In the case where the on-vehicle radar apparatus 1 is actually utilized, the orientation of the on-vehicle radar apparatus 1 may be arbitrarily set. For example, the on-vehicle radar apparatus 1 may be disposed such that +Z direction is towards the upper side, or may be disposed such that the +X direction is towards the upper side, or may be disposed having another posture.

Figure 3:
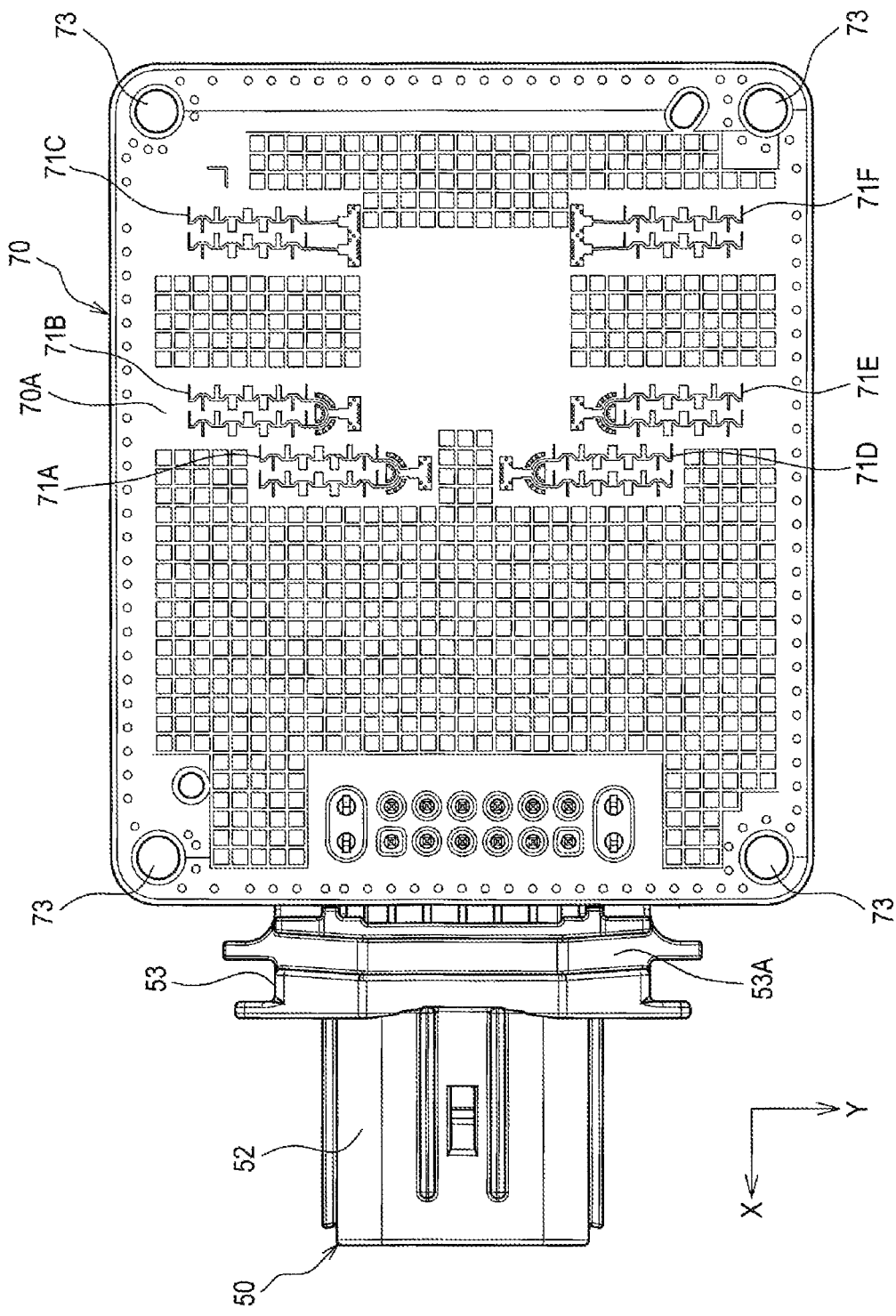
FIG. 3 is a plan view showing a printed circuit board and a connector in the on-vehicle radar apparatus according to the embodiment.
Figure 4:
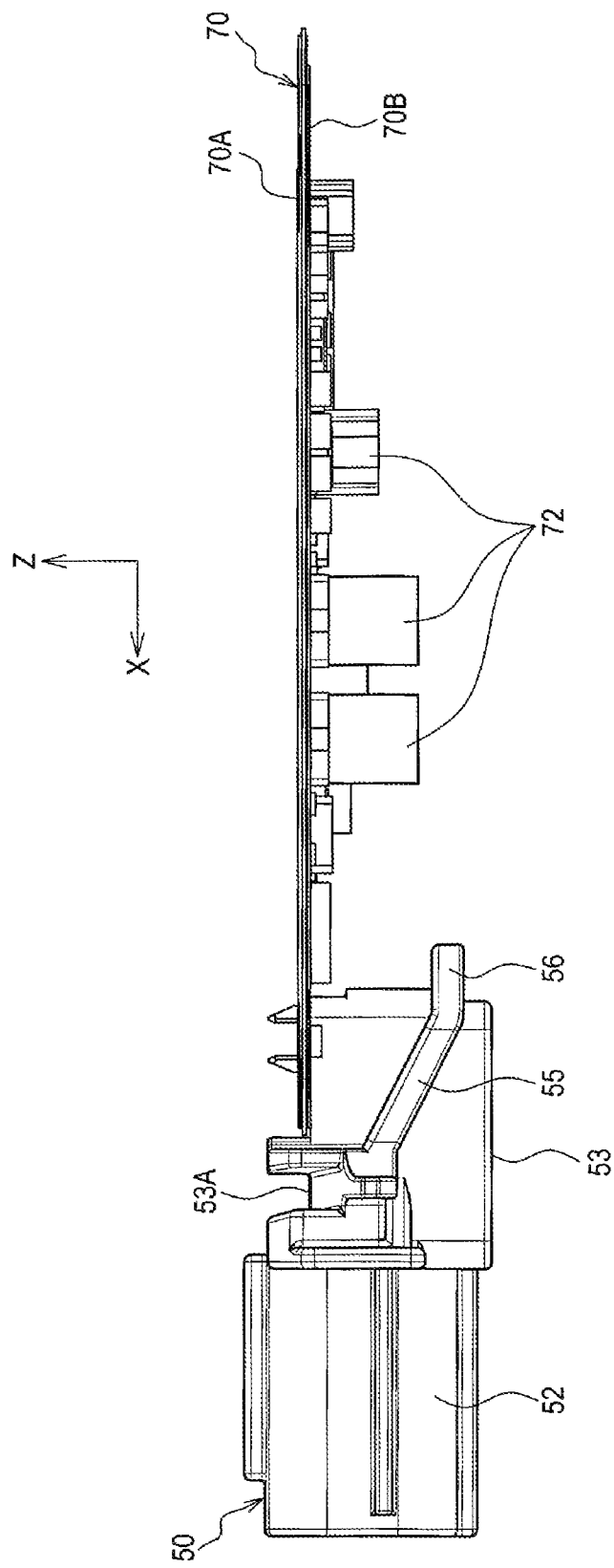
FIG. 4 is a side view showing a configuration of the printed circuit board and the connector.

As shown in FIGS. 2 to 4 which will be described later, the connector 50 is mounted on a second surface 70B of a printed circuit board 70 including radar antenna pattern units 71A to 71F on a first surface 70A thereof by a soldering such as a reflow soldering. The cover 10 is provided with a first inclined surface 11 and a second inclined surface 12. The first inclined surface and the second inclined surface are mutually inclined in the opposite direction. The first surface 11 and the second surface 12 allow electromagnetic waves which are transmitted and received by the radar antenna pattern units 71A to 71F to pass therethrough. That is, the cover 10 serves as a radome. Note that the first inclined surface 11 and the second inclined surface 12 being mutually inclined in the opposite direction refers to a case where both of the first inclined surface and the second inclined surface are inclined closer towards the printed circuit board 70 as further receding from a ridge portion 13 at which the first inclined surface 11 and the second inclined surface 12 cross each other.

A control unit 72 is mounted on the second surface 70B of the printed circuit board 70. The control unit 72 is configured to control electromagnetic waves transmitted and received through the radar antenna pattern units 71A to 71F. For the control unit 72, various configurations can be applicable. For example, a unit provided with a microcomputer, a power supply, and various electronic components such as an amplifier circuit can be configured as the control unit 72.

As shown in FIG. 13, the ridge portion 13 is provided at a portion in the cover 10 farthest from the printed circuit board 70 in the +Z direction. As described above, the first inclined surface 11 and the second inclined surface 12 are inclined closer to the printed circuit board 70 as further receding from the ridge portion 13. In the center of the ridge portion 13, a gate 15 is provided. The gate 15 is a portion where a resin was injected into a mold when the cover 10 was injection-molded. The cover 10 may be manufactured by a method other than the injection-molding. When the cover 10 is injection-molded, a thermoplastic resin is used to manufacture the cover 10. The thermo plastic resin may be a resin reinforced by glass fiber or the like.

Figure 5:
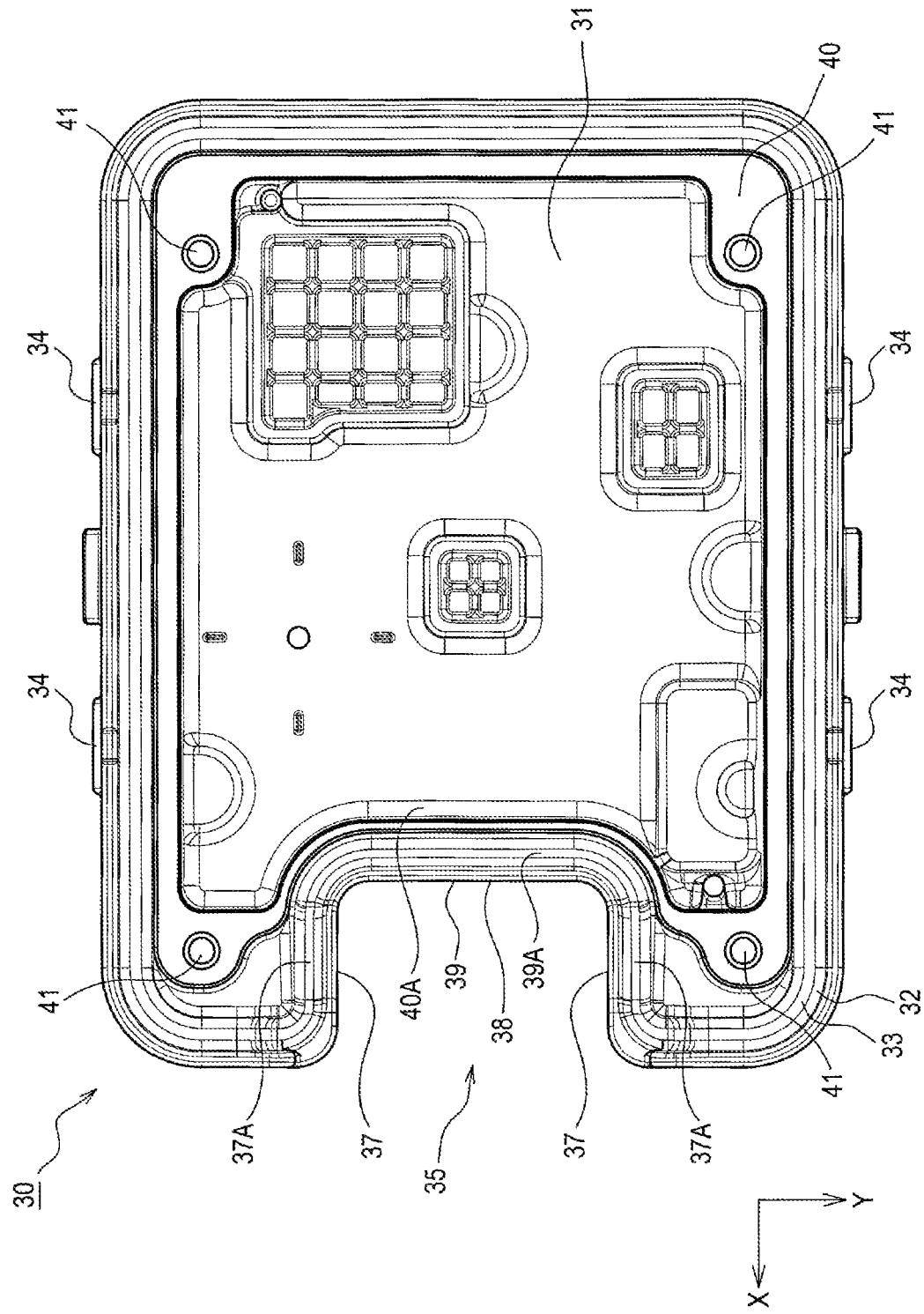
FIG. 5 is a plan view showing a configuration of a casing in the on-vehicle radar apparatus according to the embodiment.

Referring back to FIG. 1, the cover 10 is formed in a rectangular shape when viewing in −Z direction. In a periphery portion of the cover 10, a flange portion 19 is continuously formed extending in the −Z direction. The case 30 includes a base portion 31 formed in a rectangular shape when viewed from the −Z direction. In a periphery portion of the base portion 31, a wall portion 32 extending in the +Z direction is continuously formed excluding a connector receiving portion 35 which will be described later. As shown in FIGS. 2 and 5, a groove portion 33 is continuously formed in a tip end (i.e. +Z side end portion) of the wall portion 32. Note that a −Z side end portion in the flange portion 19 engages with the groove portion 33. The case 30 may be made of any materials. For example, the case 30 may be made of metal, specifically made of aluminum. The case 30 may be constituted of resin. However, the flame retardant grade may preferably be V-1 or larger in order to further favorably exhibit effects of a wall portion 40A which will be described later.

Also, in an outer peripheral surface of the flange portion 19 corresponding to a first long side and a second long side of the cover 10 (each long side in the rectangular shape when viewed from the −Z direction), two rectangular shaped flames 21 are formed extending in the −Z direction. In a portion where each frame 21 reaches when the flange portion 19 of the cover 10 engages with the groove portion 33, a hook 34 engaging with the frame 21 from inside is formed on an outer peripheral surface of the wall portion 32. These four hooks are each engaged with the frame 21, whereby the cover 10 is coupled to the case 30 in a so-called snapfit manner.

The case 30 is provided with a connector receiving portion 35 in the center of the short side of the +X side (i.e. short side of +X side in the rectangular shape when viewed from −Z direction) which is cutout towards the center of the case 30 (i.e. −X direction). The connector receiving portion 35 is formed having a large enough size capable of receiving at least a base portion 53 that supports a hood portion of the connector 50. Note that the hood portion 52 is configured as a part of the connector 50, formed in a cylindrical shape surrounding a portion of the terminal 51 of the connector 50 to be connected to other equipment, and configured to be capable of connecting to a connector of the other equipment. In FIG. 1, for the sake of convenience, illustration of the terminal 51 and the printed circuit board 70 is omitted. Those shapes and a positional relationship are shown in FIGS. 2 and 3.

A flange portion 37 is formed to support the connector 50 at each inner wall surface in both sides of the connector receiving portion 35 in +/−Y directions. For this flange portion 37, a flange portion 55 is formed at each outer peripheral surface in both sides of the base portion 53 in the +/−Y directions.

As shown in FIG. 4, a surface of the flange portion 55 supported by the flange portion 37 constitutes an inclined surface extending towards the +Z direction as it approaches the +X direction from the vicinity of the −Z side end portion at the −X side end portion of the base portion 53. Also, a surface of the flange portion 37 supporting the flange portion 55 is similarly inclined.

Figure 6:
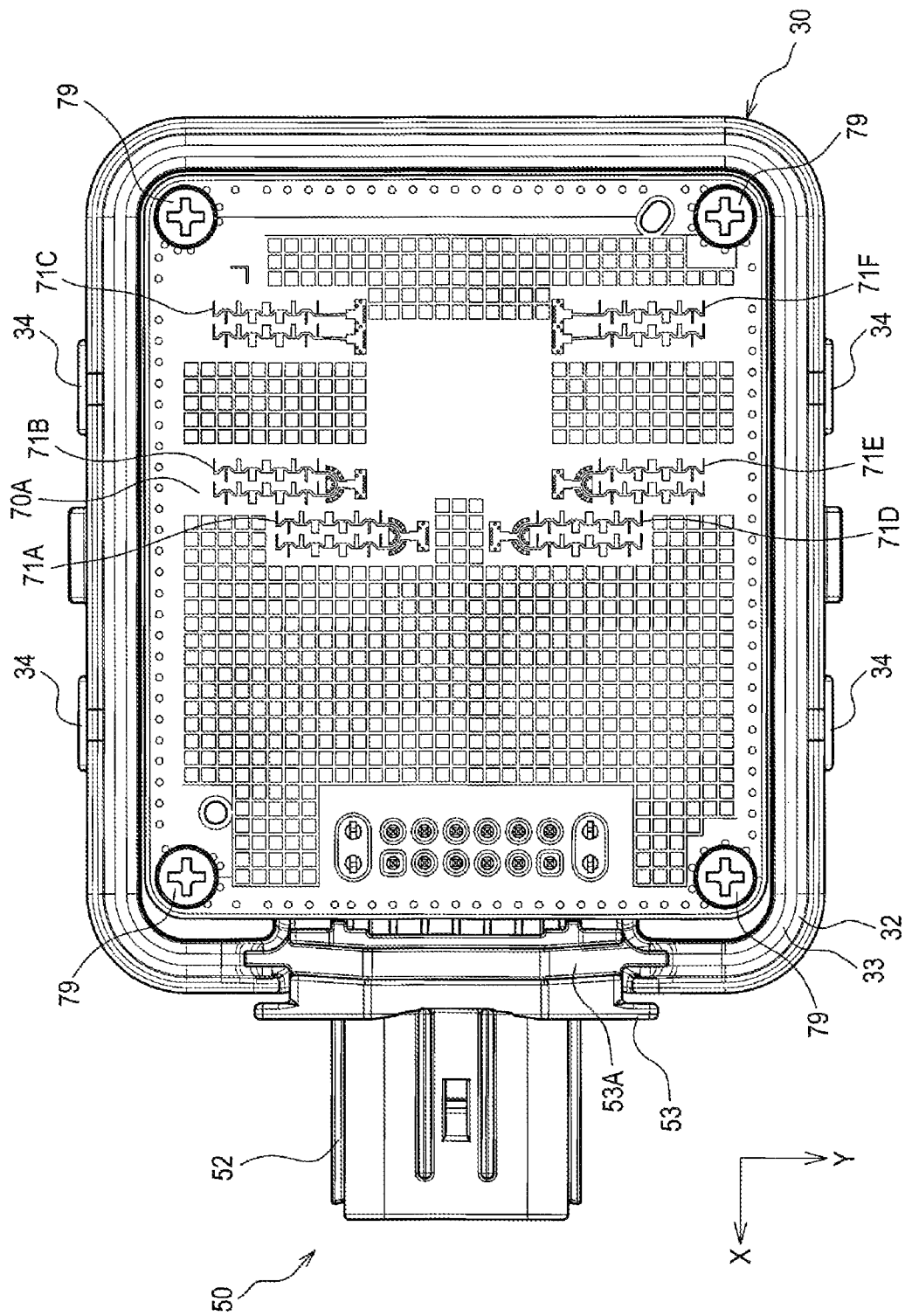
FIG. 6 is a plan view showing an assembled state of the casing and the connector in the on-vehicle radar apparatus according to the embodiment.
Figure 7:
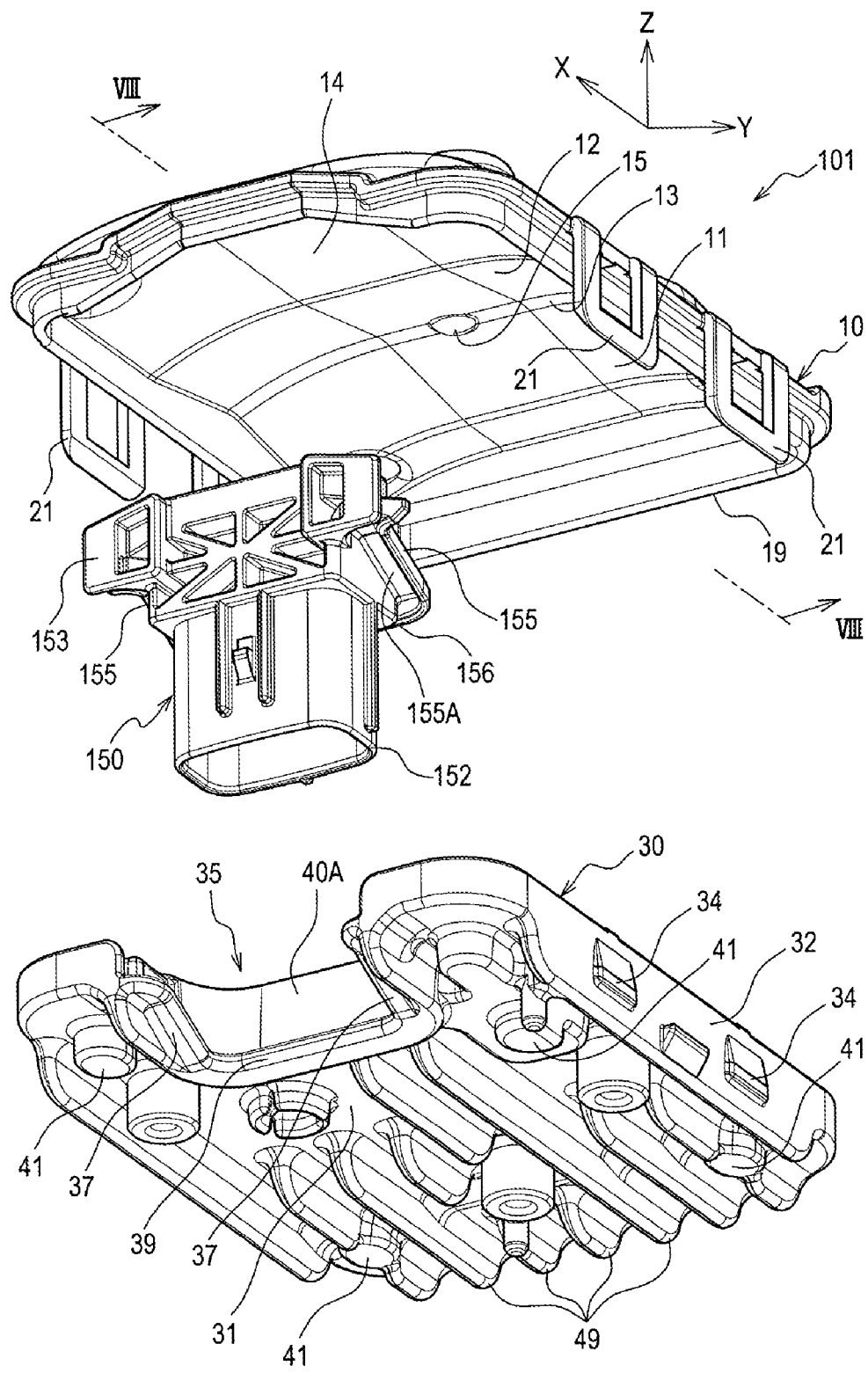
FIG. 7 is an exploded perspective view showing a configuration of a modification example of the on-vehicle radar apparatus according to the embodiment.
Figure 8:
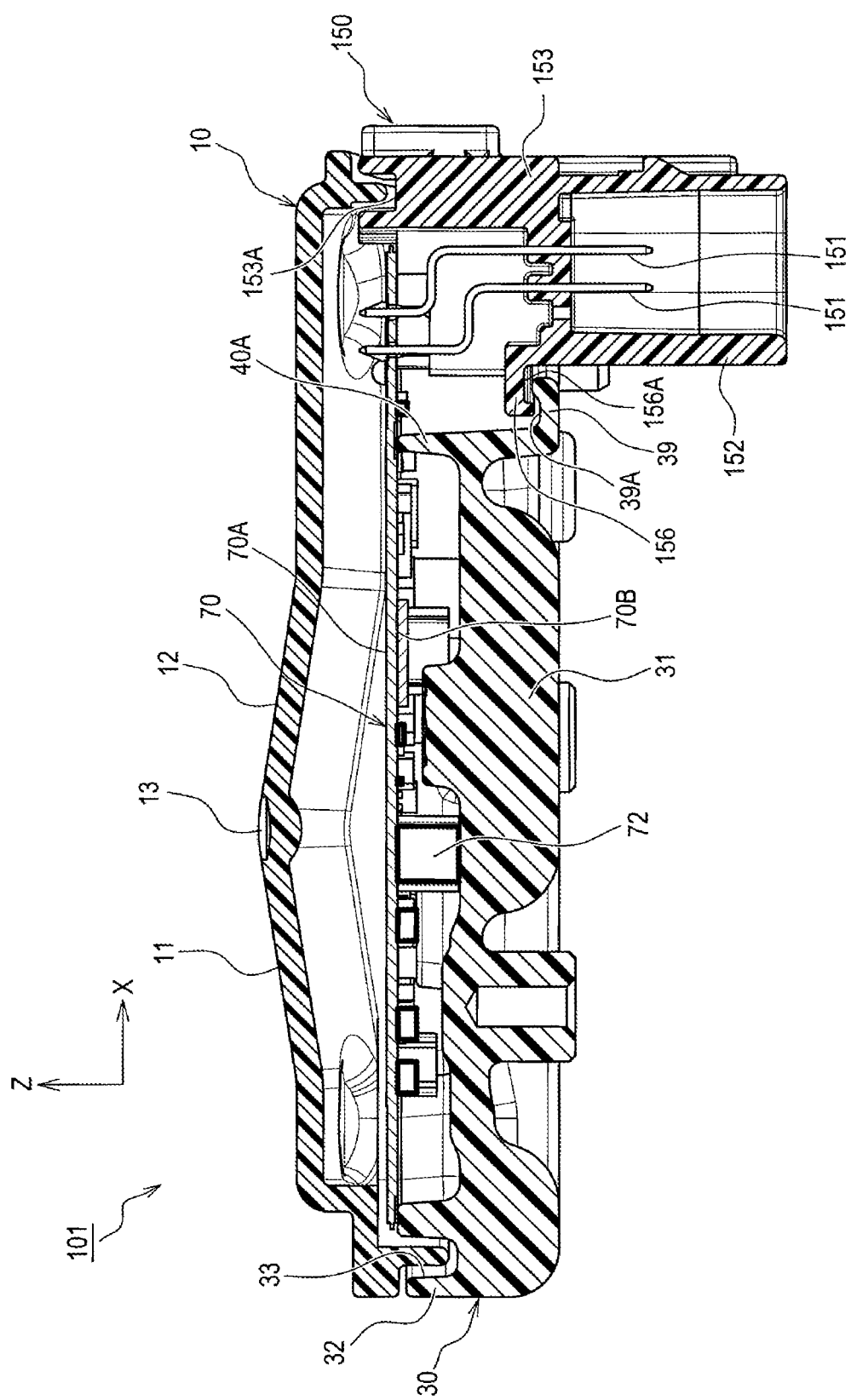
FIG. 8 is a cross-sectional view sectioned along a line VIII-VIII, showing a configuration according to the modification example.
Figure 9:
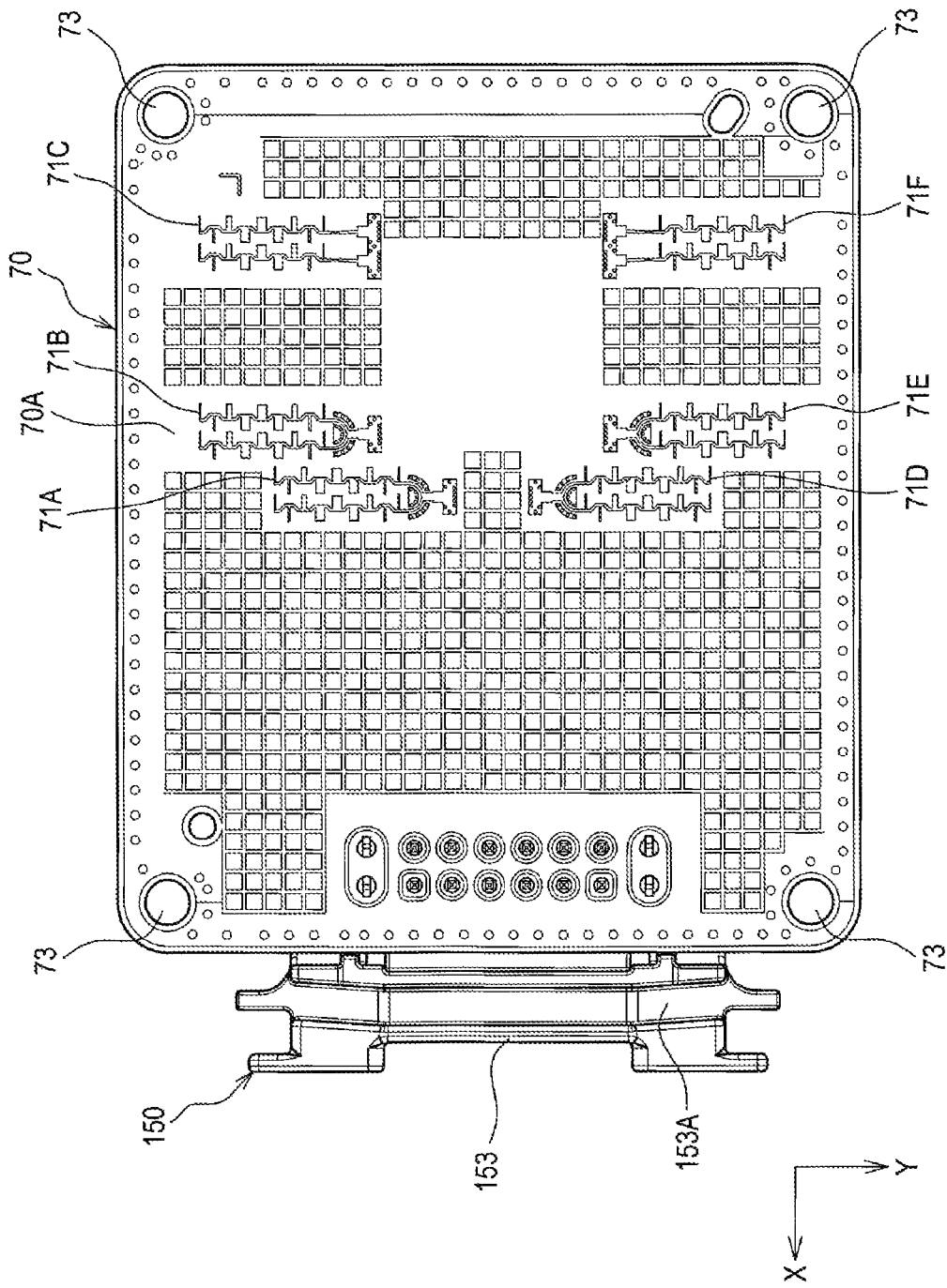
FIG. 9 is a plan view showing a printed circuit board and a connector in the on-vehicle radar apparatus according to the modification example.
Figure 10:
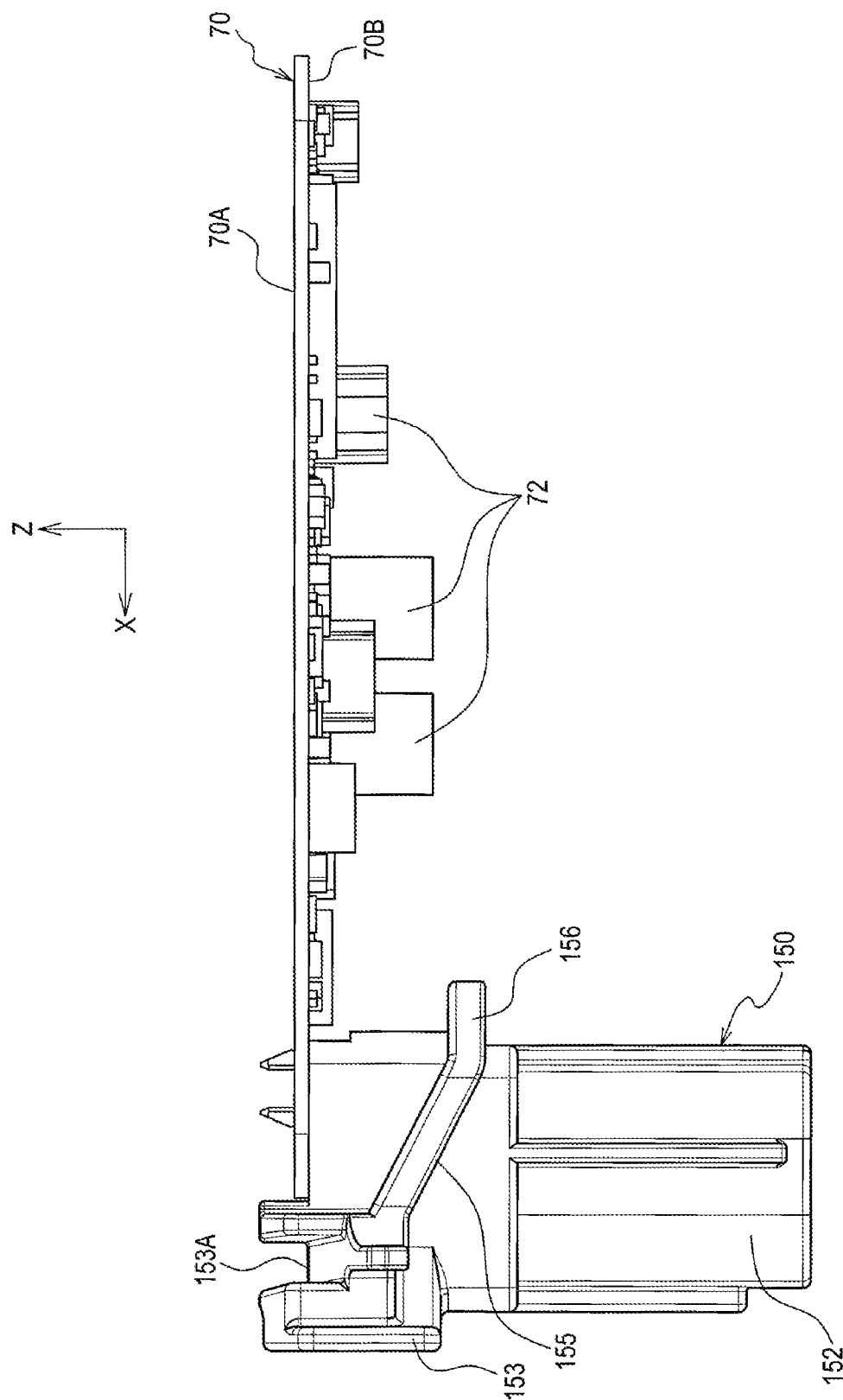
FIG. 10 is a side view showing a configuration of the printed circuit board and the connector.
Figure 11:
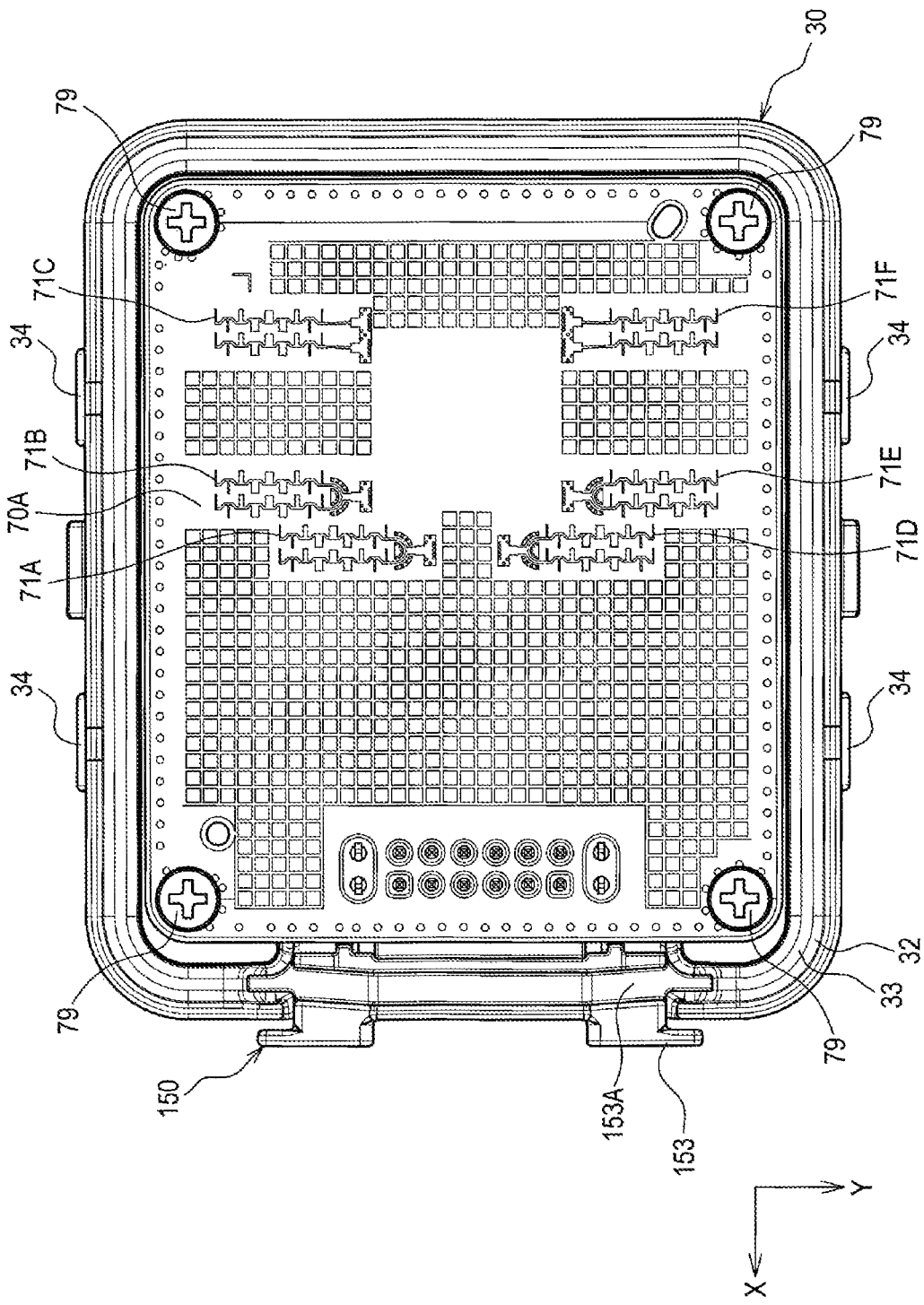
FIG. 11 is a plan view showing an assembled state of the casing, the printed circuit board and the connector of the on-vehicle radar apparatus according to the modification example.

Further, as shown in FIG. 5, a support base 40 is formed continuously at a peripheral portion in the base portion of the case 30 (i.e. base part of the wall portion 32) to support the printed circuit board 70 at a portion floating from the base portion 31 (i.e. portion away from the printed circuit board 31 in +Z direction). In the support base 40, a plurality of screw holes 41 as female screw holes are formed corresponding to a plurality of screw through holes 73 as through holes of the printed circuit board. As shown in FIG. 6, the screw 79 is screwed to the screw through hole 73 to engage with the screw hole 41, whereby the printed circuit board 70 can be attached to the case 30. When the connector receiving portion 35 receives the connector 50, as shown in FIG. 6, the printed circuit board 70 has an area throughout the entire area inside the case 30 along the printed circuit board 70. Note that the entire area is not necessarily strictly the entire area but may be an area having a margin (i.e. gap) allowing the printed circuit board 70 to be mounted easily. For example, the entire area may be 90% or more of the strictly defined entire area.

When the printed circuit board 70 is thus attached to the case 30, the hood portion 52 of the connector 50 attached to the printed circuit board 70 described above is exposed in the +X direction from the connector receiving portion 35 towards outside the on-vehicle radar apparatus 1. At this moment, the flange portion 55 of the connector 50 comes into contact with the flange portion 37 of the connector 50.

Further, as shown in FIGS. 2 and 5, a portion close to the connection receiving portion 35 in the support base 40 is configured as a thin wall portion 40A which extends in the +Z direction. The wall portion 40A is a wall which is formed having a substantially U-shape to surround the outer periphery of the flange portion 56 formed in the connector 50 (i.e. wall which is bent in the +X direction at both end portions in +/−Y directions). The wall portion constitutes a part of the inner wall surface of the connector receiving portion 35. According to this configuration, the wall portion 40A isolates the path from electronic components constituting the control unit 72 to the connector 50. Hence, if the electronic components constituting the control unit 70 catch fire, the wall portion 40A prevents the fire from spreading to the connector 50 received by the connector receiving portion 50 or outside the on-vehicle radar apparatus 1.

Further, as shown in FIG. 2, the terminal 51 of the connector 50 extends to inside the base portion 53 from inside the hood portion 52 along an axis of the hood portion 52, then the terminal 51 is bent in the base portion 53 to be in an L-shape, and soldered on the printed circuit board 70 during the mounting as described above.

With this soldering, an axial direction of the hood portion 52 (i.e. direction where the terminal 51 to be connected to other equipment is extended towards the other equipment, which corresponds to the direction of the connector 50) is maintained at a direction parallel to the second surface 70B of the printed circuit board 70. The maintenance of this direction is accomplished by an effect in which the base portion 53 mechanically contacts with the second surface 70B to support the hood portion 52 on the printed circuit board 70, cooperatively with an effect of the above-described soldering. The direction of the connector 50 thus maintained is −X direction when the printed circuit board 70 is attached to the case 30 by the screw 79 as described above.

Also, as shown in FIG. 1, a single flange portion 39 is formed at a +X side surface of the wall portion 40A (i.e. −X side inner wall surface in the connector receiving portion 35), to support a single flange portion 56 provided at the −X side outer peripheral surface in the base portion 53. Note that the flange portion 56 is connected to two flange portions 55 at the −X side end portions thereof. Similarly, the flange portion 39 is connected to two flange portions 37 at −X side end portions thereof. Further, a fin 49 is formed at the −Z side outer peripheral surface of the case 30 in order to radiate heat produced by the control unit 72 or the like.

Further, as shown in FIG. 5, a groove portion 37A capable of accepting a sealing material is formed on a surface of the flange portion 37 which is opposite to the flange portion 55. Similarly, a groove portion 39A capable of accepting a sealing material is formed on a surface of the flange portion 39 which is opposite to the flange portion 56. These groove portions 37A and 39A are coupled to the above-described groove portion 33. Also, as shown in FIG. 1, a groove portion 55A capable of accepting a sealing material is formed on a surface of the flange portion 55 which is opposite to the flange portion 37. Similarly, a grove portion capable of accepting a sealing material which is not shown is formed on a surface of the flange portion 56 which is opposite to the flange portion 39. Moreover, the above-described groove portion 33 and the flange portion 19 are designed to be fitted having a gap between the inner wall surface of the groove portion 33 and the outer peripheral surface of the flange portion 19, and the gap being capable of receiving the sealing material. Further, as shown in FIG. 6, a groove portion 53A is formed on +Z side outer peripheral surface of the base portion 53 in the connector 50, the groove portion 53A being coupled to the groove portion 33 in both sides in the +/−Y directions when mounting to the case 30.

Therefore, in the case where sealing material is coated to the above-described grove portions 33, 37A, 39A and 53A, thereafter, the cover 10 and case 30 are coupled by the snapfit manner, the printed circuit board 70 accommodated in the housing constituted of the case 30 and the cover 10 is appropriately prevented from being exposed to water. In other words, the cover 10 covers the printed circuit board 70 from a portion opposite to the case 30 and is connected to the case 30, whereby the cover 10 cooperating with the case 30 surrounds the printed circuit board 70 in a highly waterproof manner.

1-2. Configuration of Modification Example of the Embodiment

An on-vehicle radar apparatus 101 shown in FIGS. 7 to 11 of the modification example differs from the embodiment in that a connector 150 is provided instead of the connector 50. Since the on-vehicle radar apparatuses 1 and 101 have the same basic configuration, explanation for the common configuration is omitted, and different configurations will be mainly described. Note that the reference numbers as same as those in the on-vehicle radar apparatus 1 shows the same configuration and the foregoing explanation thereof will be applied.

The base portion 153 of the connector 150, when the connector 150 is mounted on the printed circuit board 70, maintains the axial direction of the hood portion 152 to be a direction perpendicular to the second surface 70B of the printed circuit board 70. The axial direction of the hood portion 152 refers to a direction along which the terminal 151 to be connected to other equipment extends towards the other equipment, and corresponds the direction of the connector 150. This maintenance of the direction is accomplished by an effect in which the base portion 153 mechanically contacts with the second surface 70B to support the hood portion 152 on the printed circuit board 70, cooperated with an effect of the soldering between the terminal 151 and the printed circuit board. The direction of the connector 150 thus maintained is the −Z direction when the printed circuit board 70 is attached to the case 30 by the screw 79.

The base portion 153 is provided with flange portions 155 and 156, and a groove portion 153A. When the connector 150 is mounted on the printed circuit board 70, the flange portions 155, 156 and the groove portions 153A have the positional relationship with respect to the printed circuit board 70 and the shape similar to those of the flange portions 55, 56 and the groove portion 53A. Further, a groove portion 15A capable of accepting sealing material is formed on a surface of the flange portion 155 which is opposite to the flange portion 37. Moreover, a groove portion (which is not shown) capable of accepting the sealing material is formed on a surface of the flange portion 156 which is opposite to the flange portion 39.

Hence, when the printed circuit board 70 is mounted to the case 30, the hood portion 152 of the connector 150 mounted on the printed circuit board 70 is exposed to outside the on-vehicle radar apparatus 1 in the −Z direction from the connector receiving portion 35. At this moment, the flange portions 155 and 156 of the connector 150 come into contact with the flange portions 37 and 39. Also, when coating the sealing material to the groove portions 33, 37A, 39A and 153A and connecting the cover 10 and the case 30 with the snapfit manner, similar to the on-vehicle radar apparatus 1, the printed circuit board 70 is appropriately prevented from being exposed to water. The printed circuit board 70 is accommodated in the housing constituted of the case 30 and the cover 10. That is, the cover 10 covers the printed circuit board 70 from a portion opposite to the case 30 and is connected to the case 30, whereby the cover 10 cooperating with the case 30 surround the printed circuit board 70 with high waterproof property.

1-3. Effects and Advantages

According to the above-described embodiment and modification example thereof, the following effects and advantages can be obtained.

(1-A) Similar to the on-vehicle radar apparatus 1, the direction of the connector 50 may be required to form a first angle 0° with respect to the first surface 70A of the printed circuit board 70. Also, similar to the on-vehicle radar apparatus 101, the direction of the connector 150 may be required to form a second angle 90° with respect to the first surface 70A. In either case, the case 30 and the cover 10 which are common in the above-described embodiment and the modification thereof can be used. Specifically, even in the case where directions of the connectors are different with respect to respective printed circuit boards 70 on which the radar antenna pattern unit 71A to 71F are mounted, respective printed circuit boards 70 can be supported by common case 30. In other words, since the on-vehicle radar apparatus 1 is provided with the connector receiving portion 35, when required to change the direction of the connector, the on-vehicle radar apparatus 1 can be adapted to change the direction of the connector by using the common case 30 and the cover 10.

Further, the connector 50 is soldered to the printed circuit board 70 such that the direction of the connector 50 is set to be 0° with respect to the first surface 70A. Similarly, the connector 150 is soldered to the printed circuit board 70 such that the direction of the connector 150 is set to be 90° with respect to the first surface 70A. Hence, unlike the case where the direction of the connector is changed with respect to the printed circuit board, the directions of the connectors 50 and 150 can be prevented from being changed due to external force.

(1B) The flange portions 55 and 155 are formed on the outer peripheral surfaces of the base portions 53 and 153 of the connectors 50 and 150. The flange portions 55 and 155 protrude along surfaces inclined with respect to the respective connectors. The flange portion 37 is formed, corresponding to these flange portions 55 and 155, on the inner peripheral surfaces of the connector receiving portion 35. The flange portion 75 protrudes along a surface inclined with respect to the first surface 70A supported by the case 30. In the case where the printed circuit board 70 is attached to the case 30 by the screw 79 and the connector receiving portion 35 receives the connector 50 and the connector 150, the flange portion 55 comes into contact with the flange portion 37, or the flange portion 155 comes into contact with the flange portion 37.

Therefore, a force produced in the −Z direction by tightening the screw 79 can be applied to the connector 50 or the connector 150 along the XY plane, whereby a positional alignment of the connector 50 or the connector 150 relative to the cover 10 and the case 30 can be appropriately accomplished.

(1C) In the wall portion 32, the groove portion 33 that receives a sealing material is formed in order to seal the gap formed with the flange portion 19. Hence, water can be prevented from coming from outside the on-vehicle radar apparatus 1 or the on-vehicle radar apparatus 101 through a portion between the case 30 and the cover 10 towards the printed circuit board 70. In the flange portions 55, 37, 39 and 56, groove portions 55A, 37A, 39A and unshown groove portions are formed to accept the sealing material for sealing the gap formed with the flange portions 37, 55, 56 and 39 facing these flange portions 55, 37, 39 and 56. Accordingly, water can be prevented from entering the on-vehicle radar apparatus 1 through a portion between the case 30 and the connector 50 towards the printed circuit board 70. In the base portion 53 of the connector 50, the groove portion 53A is formed to accept the sealing material for sealing the gap formed with the flange portion 19 facing this base portion 53. Accordingly, water can be prevented from entering the on-vehicle radar apparatus 1 through a portion between the connector 50 and the cover 10 towards the printed circuit board 70.

In the flange portions 155, 137, 139 and 156, groove portions 155A, 37A, 39A and unshown groove portions are formed to accept the sealing material for sealing the gap formed with the flange portions 37, 155, 156 and 39 facing these flange portions 155, 37, 39 and 156. Accordingly, water can be prevented from entering the on-vehicle radar apparatus 101 through a portion between the case 30 and the connector 50 towards the printed circuit board 70. In the base portion 53 of the connector 150, the groove portion 153A is formed to accept the sealing material for sealing the gap formed with the flange portion 19 facing this base portion 53. Accordingly, water can be prevented from entering the on-vehicle radar apparatus 101 through a portion between the connector 150 and the cover 10 towards the printed circuit board 70. According to the on-vehicle radar apparatus 1 and the on-vehicle radar apparatus 101, the printed circuit board 70 can be enclosed in a highly waterproof manner.

(1D) Furthermore, the groove portion 53A formed on the base portion 53 is coupled to the groove portion 33 of the case 30 when the connector 50 is mounted on the printed circuit board 70 and the printed circuit board 70 is supported by the case 30. Accordingly, water can be prevented from entering the on-vehicle radar apparatus 1 through a portion between the connector 50 and the cover 10 towards the printed circuit board 70. The groove portion 153A formed on the base portion 153 is coupled to the groove portion 33 of the case 30 when the connector 150 is mounted on the printed circuit board 70 and the printed circuit board 70 is supported by the case 30. Accordingly, water can be prevented from entering the on-vehicle radar apparatus 101 through a portion between the connector 150 and the cover 10 towards the printed circuit board 70. According to the on-vehicle radar apparatus 1 and the on-vehicle radar apparatus 101, the printed circuit board 70 can be enclosed in a highly waterproof manner.

(1E) The case 30 is provided with the wall portion 40A which isolates a path from the control unit 72 to the connector 50 or the connector 150 between the control unit 72 mounted on the printed circuit board 70 and the connector receiving portion 35. Hence, according to the on-vehicle radar apparatus 1, in case the electronic components constituting the control unit 72 catch fire, the wall portion 40A prevents the fire from spreading to the connector 50 received by the connector receiving portion 50 or outside the on-vehicle radar apparatus 1. Similarly, according to the on-vehicle radar apparatus 101, in case the electronic components constituting the control unit 72 catch fire, the wall portion 40A prevents the fire from spreading to the connector 150 received by the connector receiving portion 35 or outside the on-vehicle radar apparatus 101.

(1F) When the connector is disposed outside the outer peripheral surface of the housing constituted of the cover 10 and the case 30, it is impossible to minimize the on-vehicle radar apparatus. However, according to the on-vehicle apparatus 1, a part of the connector 50 including a part of the hood portion 52 are disposed inside the outer peripheral surface of the housing constituted of the cover 10 and the case 30. Similarly, according to the on-vehicle apparatus 101, a part of the connector 150 including a part of the hood portion 152 are disposed inside the outer peripheral surface of the housing constituted of the cover 10 and the case 30. Therefore, according to the on-vehicle radar apparatus 1 and the on-vehicle radar apparatus 101, size of these apparatuses can be suitably smaller. Further, according to this configuration, a part of the connector 50 or the connector 150 may be disposed inside the case 30, and the size of the printed circuit board 70 can readily be larger as much as possible.

(1G) The printed circuit board 70 has an area throughout the entire area inside the case 30 along the printed circuit board 70. Hence, compared to a case where the printed circuit board 70 does not have an area throughout the entire area inside the case 30 along the printed circuit board 70, the size of the on-vehicle radar apparatus 1 or the on-vehicle radar apparatus 101 can be smaller. Then, the mountability of the on-vehicle radar apparatus 1 or the on-vehicle radar apparatus 101 onto the vehicle can be enhanced.

1-4. Correspondence with Scope of Claims

In the above-described embodiments and the modification thereof, the terminal 51 corresponds to first terminal, the connector 50 corresponds to first connector, the terminal 151 corresponds to second terminal, the connector 150 corresponds to second connector, the surface in the flange portion 37 side of the flange portion 55 corresponds to a first inclined surface, the surface in the flange portion 55 side of the flange portion 37 corresponds to a second inclined surface, the groove portions 55A and 37A correspond to a sealing groove portion, the groove portion 33 corresponds to first groove portion, the groove portion 53A corresponds to a second groove portion, and the wall-shaped portion 40A corresponds to a wall.

Other Embodiments

Embodiments of the present disclosure is described so far. The present disclosure is not limited to the above-described embodiments but may be modified and implemented in various manners.

(2A) According to the above-described embodiments and the modification thereof, a part of the connector 50 or the connector 150 including a part of the hood portion 52 or the hood portion 153 is disposed inside the outer peripheral surface of the housing constituted of the cover 10 and the case 30. However, the present disclosure is not limited thereto. For example, depending on the shape of the connector which will be a connection object of the on-vehicle radar apparatus, whole connector including the hood portion in the on-vehicle radar apparatus may be disposed inside the outer peripheral surface of the housing.

(2B) According to the above-described embodiment and modification thereof, the orientation of the connector 50 or the connector 150 which are mounted on the printed circuit board 70 is set to be parallel or perpendicular to the first surface 70A. However, the present disclosure is not limited to this configuration. The orientation of the connector mounted on the printed circuit board 70 may be disposed obliquely with respect to the first surface.

(2C) The shapes of respective portions disclosed in the above-described embodiment and the modification thereof are not limited thereto. For example, the printed circuit board may be formed in a disk shape or a triangular shape or other shapes.

(2D) According to the above-described embodiment and modification thereof, the flange portion 55 constitutes the first surface and the flange portion 37 constitutes the second surface, but the present disclosure is not limited to this configuration. For example, a portion of the flange portion 55 which is opposite to the flange portion 37 may be formed having larger thickness. Similarly, a portion of the flange portion 37 which is opposite to the flange portion 55 may be formed having larger thickness. Also, a sealing groove for accepting the sealing material may be formed on either the first inclined surface or the second inclined surface.

(2E) Multiple functions of a single component in the above-described embodiment may be implemented by multiple components, and a single function of a single component may be implemented by multiple components. Moreover, multiple functions of multiple components may be implemented by a single component, and a single function implemented by multiple components may be implemented by a single component. Further, some of the configurations of the above-described embodiment may be omitted. In addition, at least some of the configurations of the above-described embodiment may be added to or replaced with the configurations of the other embodiments described above.

CONCLUSION

As a first aspect of the present disclosure, in an on-vehicle radar apparatus, even in a case where the orientations of the connectors with respect to the printed circuit boards are mutually different, respective printed circuit board are supported by a common case, and the respective orientations of the connectors are prevented from being changed by external force. The above-described printed circuit board refers to a printed circuit board on which a radar antenna pattern unit is mounted.

An on-vehicle radar apparatus according to one aspect of the present disclosure is provided with a printed circuit board, a case and a cover. The radar antenna pattern unit capable of transmitting and receiving radar waves is mounted on a first surface of the printed circuit board. The case supports the printed circuit board. The cover covers the printed circuit board from a portion opposite to the case, and is connected to the case, whereby the cover cooperating with the case surround the printed circuit board.

The connector receiving portion formed on the case receives the connector in the following manner. A first connector provided with a first terminal to be connected to other equipment may be mounted on the printed circuit board such that a direction along which the first terminal extends towards the other equipment forms a first angle with respect to the first surface of the printed circuit board. In this case, the connector receiving portion receives, when the printed circuit board is supported by the case, the first connector such that the first connector is exposed from the case. A second connector provided with a second terminal to be connected to other equipment may be mounted on the printed circuit board such that a direction along which the second terminal extends towards the other equipment forms a second angle with respect to the first surface of the printed circuit board. In this case, the connector receiving portion receives, when the printed circuit board is supported by the case, the second connector such that the second connector is exposed from the case.

According to such a configuration, a common case and cover can be used for situations where the connector orientation of the printed circuit board is required to form either a first angle or a second angle with respect to the first surface of the printed circuit board. In other words, even if the connector orientations are mutually different with respect to the printed circuit board on which the radar antenna pattern unit is mounted, respective printed circuit boards can be supported by a common case.

The connector may be mounted on the printed circuit board by soldering or the like such that the connector orientation produces a first angle or a second angle. Hence, the connector orientation can be prevented from being changed by external force.

What is claimed is:

1. An on-vehicle radar apparatus provided with at least one radar antenna pattern unit capable of transmitting and receiving radar waves, comprising:
    a printed circuit board in which the at least one radar antenna pattern unit is mounted on a first surface thereof;
    a case that supports the printed circuit board;
    a cover that covers the printed circuit board from a portion opposite to the case, and is connected to the case, whereby the cover cooperating with the case surround the printed circuit board; and
    a connector receiving portion formed on the case, wherein
        in a situation that a first connector provided with a first terminal to be connected to other equipment is mounted on the printed circuit board such that a direction along which the first terminal extends towards the other equipment forms a first angle with respect to the first surface of the printed circuit board,
        the connector receiving portion receives, when the printed circuit board is supported by the case, the first connector such that the first connector is exposed from the case; and
        in a situation that a second connector provided with a second terminal to be connected to other equipment is mounted on the printed circuit board such that a direction along which the second terminal extends towards the other equipment forms a second angle with respect to the first surface of the printed circuit board,
        the connector receiving portion receives, when the printed circuit board is supported by the case, the second connector such that the second connector is exposed from the case.

2. The on-vehicle radar apparatus according to claim 1, wherein
    at least one first inclined surface inclined with respect to a direction along which the first terminal extends towards the other equipment is formed on an outer peripheral surface of the first connector;
    at least one second inclined surface inclined with respect to the first surface of the printed circuit board supported by the case is formed on an inner peripheral surface of the connector receiving portion; and
    the first inclined surface and the second inclined surface come into contact with each other, when the connector receiving portion receives the first connector.

3. The on-vehicle radar apparatus according to claim 2, wherein
    a sealing groove portion is formed on the first inclined surface or the second inclined surface for accepting a sealing material to seal a gap between the first inclined surface and the second inclined surface.

4. The on-vehicle radar apparatus according to claim 1, wherein
    the case is provided with at least one first groove portion in a portion to be connected to the cover to accept a sealing material to seal a gap between the case and the cover; and
    the first connector is provided with at least one second groove portion for accepting a sealing material to seal a gap between the connector and the cover by coupling with the first groove portion when the connector is mounted on the printed circuit board and the printed circuit board is supported by the case.

5. The on-vehicle radar apparatus according to claim 1, wherein
    the case is provided with a wall positioned between an electronic component mounted on the printed circuit board and the connector receiving portion, the wall isolating a path from the electronic component to the connector.

6. The on-vehicle radar apparatus according to claim 1, wherein
    the printed circuit board has an area throughout an entire area inside the case along the printed circuit board.

* * * * *